(12) United States Patent
Francisco et al.

(10) Patent No.: US 7,604,737 B2
(45) Date of Patent: Oct. 20, 2009

(54) WATER FILTER DEVICE FOR USE WITH INDIVIDUAL CONTAINERS

(75) Inventors: Michael H. Francisco, Menlo Park, CA (US); Subhash Mehra, Mumbai (IN); Sumeet Mehra, Mumbai (IN)

(73) Assignee: Acuity/Sparkle, Ltd. (Cayman), Grand Cayman (KY)

( * ) Notice: Subject to any disclaimer, the term of this patent is extended or adjusted under 35 U.S.C. 154(b) by 0 days.

(21) Appl. No.: 12/020,177

(22) Filed: Jan. 25, 2008

(65) Prior Publication Data

US 2008/0203005 A1    Aug. 28, 2008

Related U.S. Application Data

(60) Provisional application No. 60/897,355, filed on Jan. 25, 2007.

(51) Int. Cl.
*C02F 1/28* (2006.01)
*C02F 1/44* (2006.01)
*C02F 9/02* (2006.01)
*B01D 61/18* (2006.01)
*B01D 63/02* (2006.01)

(52) U.S. Cl. .................. 210/232; 210/266; 210/321.69; 210/321.89; 210/321.9

(58) Field of Classification Search .................. 210/232, 210/266, 321.69, 321.89, 321.9
See application file for complete search history.

(56) References Cited

U.S. PATENT DOCUMENTS

| | | | |
|---|---|---|---|
| 5,105,993 A * | 4/1992 | La Haye et al. | 222/189.09 |
| 5,681,463 A | 10/1997 | Shimizu et al. | |
| 5,840,185 A | 11/1998 | Hughes et al. | |
| 5,914,045 A | 6/1999 | Palmer et al. | |
| 6,117,319 A | 9/2000 | Cranshaw | |
| 6,395,170 B1 | 5/2002 | Hughes et al. | |
| 6,733,669 B1 | 5/2004 | Crick | |
| 2002/0036176 A1 | 3/2002 | Hughes et al. | |
| 2005/0035041 A1* | 2/2005 | Nohren et al. | 210/209 |

* cited by examiner

*Primary Examiner*—Thomas M Lithgow
(74) *Attorney, Agent, or Firm*—Schneck & Schneck; Thomas Schneck

(57) ABSTRACT

An apparatus for producing purified drinking water. The apparatus comprises a container top including an ultrafiltration insert. The container top attaches to the opening of a liquid holding container, such that liquid from the container passes through a filter. The device includes a mechanism for back flushing or cleaning the filter. The resulting water is substantially pure, being free of bacteria, to make it safe for drinking.

5 Claims, 2 Drawing Sheets

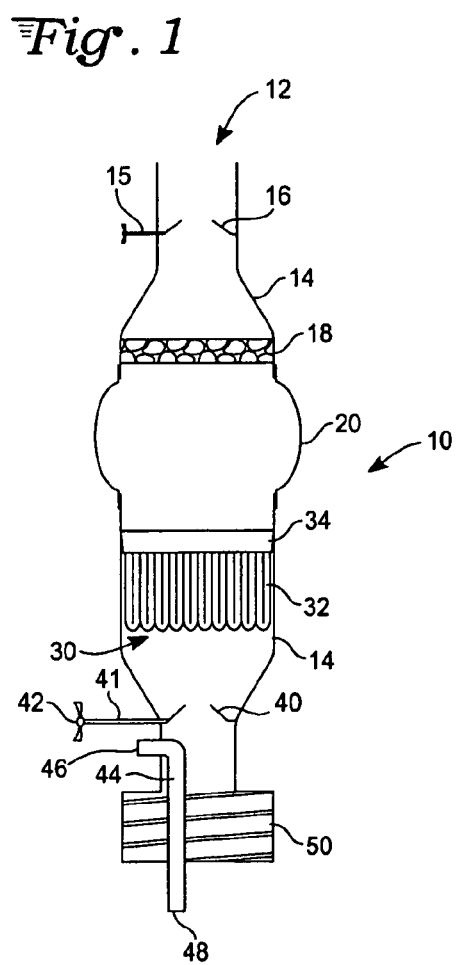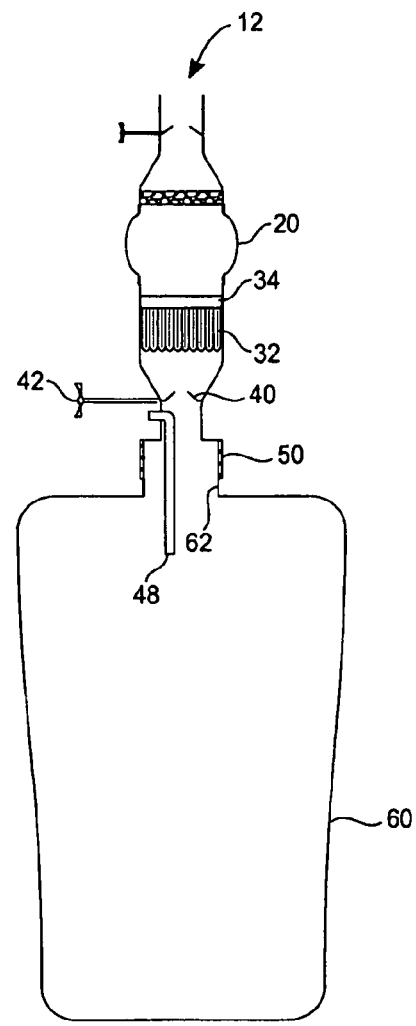
Fig. 1
Fig. 2

WATER FILTER DEVICE FOR USE WITH INDIVIDUAL CONTAINERS

CROSS-REFERENCE TO RELATED APPLICATION

This application claims priority from U.S. provisional application No. 60/897,355, filed Jan. 25, 2007.

TECHNICAL FIELD

The present invention relates to a device for purifying water and more specifically to a device to provide purified drinking water for personal use.

BACKGROUND

Potable (i.e., drinking) water is a necessity to which millions of people throughout the world have limited access. Water is often seen as the most basic and accessible element of life, and seemingly the most plentiful. There is no standard for how much water a person needs each day, but experts usually put the minimum at 100 liters for adults. Most people drink two or three liters—less than it takes to flush a toilet. The rest is typically used for cooking, bathing, and sanitation. Adult Americans consume between four hundred and six hundred liters of water each day.

By 2050, there will be at least nine billion people on the planet, the great majority of them in developing countries. If water were spread evenly across the globe, there might be enough for everyone. But rain often falls in the least desirable places at the most disadvantageous times. More than a billion people lack access to drinking water. Simply providing access to clean water could save two million lives each year.

Water purification processes are well known and used throughout the world. Water purification is the removal of contaminants from raw water to produce drinking water that is pure enough for human consumption. Substances that are removed during the process include parasites (such as Giardia or Cryptosporidium), bacteria, algae, viruses, fungi, minerals (including toxic metals such as lead, copper and arsenic), and man-made chemical pollutants. Many contaminants can be dangerous. Other contaminants are removed to improve the water's smell, taste, and appearance.

It is not possible to tell whether water is safe to drink just by looking at it. Simple procedures such as boiling or the use of a household charcoal filter are not sufficient for treating water from an unknown source. Even natural spring water considered safe for all practical purposes in the 1800s must now be tested before determining what kind of treatment is needed. Water emerging from shallow groundwater is usually taken from wells or boreholes. The bacteriological quality can be variable depending on the source.

Typically located in the headwaters of river systems, upland reservoirs are usually sited above any human habitation and may be surrounded by a protective zone to restrict the opportunities for contamination. Bacteria and pathogen levels are usually low, but some bacteria, protozoa or algae will be present. Low land surface waters, such as rivers, canals and low land reservoirs, will have a significant bacterial load and may also contain algae, suspended solids and a variety of dissolved constituents. Surface water may be contaminated with biological and chemical pollutants and may potentially transmit diseases such as diarrhea, dysentery, typhoid, cholera and hepatitis. Because of risk of contamination, surface water should never be used for drinking without treatment and/or disinfection.

Many processes are available for purification of water, with their use depending on the particular contaminants present in the water. Ultrafiltration membranes are a relatively new development; they use polymer film having microscopic pores that can be used in place of granular media to filter water effectively without coagulants. The type of membrane media determines how much pressure is needed to drive the water through and what sizes of micro-organisms can be filtered out. In ultrafiltration, hydrostatic pressure forces a liquid against a semipermeable membrane. Suspended solids and solutes of high molecular weight are retained in the filter up to about 0.01 microns in size. This removes bacteria and many viruses (which commonly adhere to the bacteria), but not salts (ions), while water and low molecular weight solutes pass through the membrane.

It is desirable to have a reusable water filtration device that attaches to a water bottle or other portable water container and contains an ultrafiltration membrane. The device may provide a design that allows water to pass through the ultrafiltration membrane with minimal pressure. Preferably, the device includes a flushing mechanism that cleans the ultrafiltration membrane without having to disassemble the bottle cap.

SUMMARY OF THE INVENTION

It is an object of the invention to fulfill the need for a reusable bottle cap water filter that can provide purified drinking water free from bacterial contamination. Therefore, the present invention provides a portable and reusable apparatus for purification of water using an ultrafiltration membrane and requires only low pressure, such as may be generated by squeezing the bottle, sucking water through the opening of the bottle cap, or merely through the action of gravity. Preferably, the apparatus comprises a flushing mechanism that is useful for cleaning the ultrafiltration membrane without requiring disassembly of the apparatus.

BRIEF DESCRIPTION OF THE DRAWINGS

FIG. 1 is a cross sectional view of an embodiment of a water filter unit device which may be attached to a water container.

FIG. 2 is a cross section of a water container having an alternative embodiment attached to the top of the water container.

DETAILED DESCRIPTION

Figure 3:
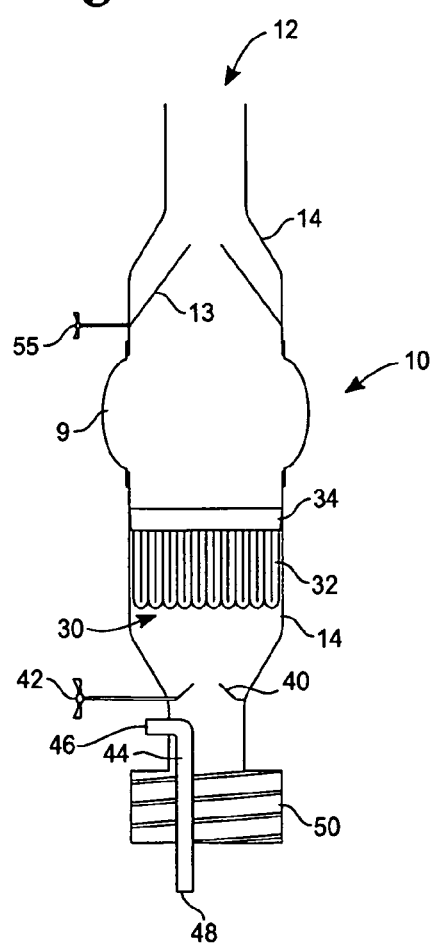
FIG. 3 is a cross section of an alternative embodiment having an alternate means of back flushing

At least one advantage of at least some embodiments is that these embodiments provide a reusable bottle cap water filter for use when attached to a water bottle, including an ultrafiltration membrane, and at least one one-way valve to prevent flow of water back into the water bottle. The ultrafiltration membrane is configured such that surface area is maximized, such as by elongated ultrafiltration membrane fibers, and does not require more than minimal pressure to pass water through the filter. The water filter of the present invention would be operable by squeezing the water bottle if the water bottle is made of a resilient polymer compressible skin, or other similar resilient material, thus forcing water through the water filter, by sucking on the outer opening of the bottle cap, thus forcing water through the filter (for use in a rigid polymer or metal container that do not compress), or merely by the action of gravity, inverting the water bottle and allowing water to pass through the filter.

In one embodiment, the bottle cap water filter apparatus includes a flushing mechanism for cleaning the ultrafiltration membrane by forcing purified water back through the filter and into the water bottle, thereby flushing any particles off the surface of the ultrafiltration membrane.

FIG. 1 is a drawing of one embodiment. The bottle cap may have an elongated, cylindrical shape. In this embodiment, the reusable bottle cap water filter apparatus is attachable to a water bottle, preferably via complementary threading such as on a screw cap. Immediately adjacent to the screw cap is a one-way valve with a mechanical shutoff to prevent water from flowing back through the membrane.

With reference to FIG. 1, screw cap 50 allows attachment of the water purification device onto a liquid holding container, such as a water bottle. In some applications an air intake tube 44 having an air intake inlet 46 to allow inlet of ambient air and an air intake outlet 48 extending into the bottle may be used to equalize pressure. During backflow, allowing air to leave the container may be desirable. During drinking, inlet 46 may be covered with a finger to prevent water from flowing through the tube.

Water may be drawn through the system by a user sucking on opening 12, by squeezing the bottle onto which the filtration device 10 is placed, or by inverting the bottle. When this is done, water will move past valve 40 into chamber 30 and through ultrafiltration membranes 32. In the illustrated embodiment, the ultrafiltration membranes are tubular structures, having their open ends potted in membrane holder 34, such that for water to pass from one side of membrane holder 34 to the other side of membrane holder 34 requires that the water first pass through membrane 32. The water is drawn through a charcoal filter 18 retained within housing 14. A user can then drink the water from opening 12.

To backflush the membrane, one way valve 16 is closed using mechanical shutoff 15. This prevents water from flowing to opening 12. Flushing mechanism 20 in this example is a simple bulb made of a resilient polymer material. Squeezing flushing mechanism will drive water back through the filtration membrane 32, effectively back flushing the filter using filtered water. The pores of the ultrafiltration membrane will be cleared; allowing the filtration device to one again is used.

Flow into the bottle can be stopped using one-way valve 40 controlled by mechanical shutoff 41.

With respect to FIG. 2, the device of FIG. 1 is shown attached to bottle 60. The threads on neck 62 of bottle 60 allow screw cap 50 to be screwed onto the bottle.

With respect to FIG. 3, an alternative embodiment is shown. As before, a screw cap 50 allows attachment to the bottle, an air intake tube 44 includes an inlet 46 and an outlet 48 to allow air to be displaced from a bottle or other container to which the device is attached. As water is drawn into chamber 30, it filters through filter membrane 32, flows through membrane holder 34 and is drawn by the user through opening 12. Here arms 13 attached to mechanical actuator 55 allow the purging of water from chamber 9 by mechanically intruding arms 13 into chamber 9, which mate to displace some of the contents of chamber 9.

It will be readily understood that a number of different mechanisms may be used for back flushing membrane 32. Any mechanism that reduces the size of chamber over the membrane will cause liquid to be back flushed through the membrane.

Figure 4:
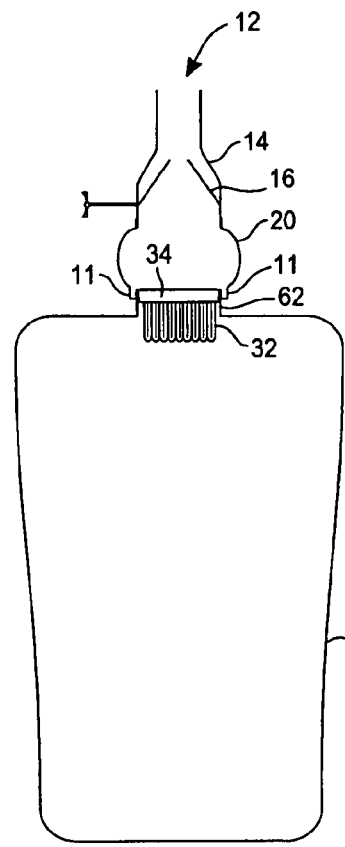
FIG. 4 is a cross section of a water container and a filter unit which attaches to the top of a water container, with the filter extending into the water container.

With reference to FIG. 4, bottle 60 is shown having a neck 62, which may taper. Held at this neck is membrane 32 held in membrane holder 34. Membrane holder 34 may be held in neck 62 that tapers. The housing 14 of the water filtration device has a lip 11 which may snap over an annular lip on neck 62, attaching the filtration device onto the bottle 60. As in FIG. 1, the purified water flows through opening 12 and water may be purged by shutting one-way valve 16 and squeezing flushing mechanism 20.

The apparatus of the above embodiments preferably uses an ultrafiltration membrane capable of filtering bacteria from water, to provide potable water free of contamination. The ultrafiltration membrane of the preferred embodiment has a maximized surface area, produced by stretching the ultrafiltration membrane into tubular filaments. The ultrafiltration membrane used in the preferred embodiment is made from Ultra-Flo DUC 108 ultrafiltration membrane from Ultra-Flo PTE Ltd., 452 Tasgore Industrial Avenue, Singapore 787823. This is described in co-pending application Ser. No. 11/941,713 hereby expressly incorporated by reference for all purposes herein.

One embodiment also optionally contains a charcoal filter to further purify and enhance the taste of the water exiting the filter. At the outlet opening of the apparatus is a second, optional one-way valve with mechanical shutoff to prevent water from flowing back into the water bottle during flushing.

One problem with ultrafiltration membranes is clogging by particles and bacteria. In the illustrated embodiments, some water is retained within the housing of the filtration device 10 of FIG. 1 to keep the ultrafiltration membrane wet. Further, additional water is retained in the apparatus at a point subsequent to passing through the ultrafiltration membrane. These embodiments contain a flushing mechanism to force the retained water back in the direction of the water bottle, passing through the ultrafiltration membrane in the opposite direction. By flushing water back through the membrane, the filter is thereby cleaned of any particles sticking to it.

As depicted in FIG. 1, the flushing mechanism is a portion of the bottle cap that is capable of being compressed or squeezed, creating pressure that forces the water back in the opposite direction. Alternatively, the flushing mechanism is comprised of complementary threaded portions of the bottle cap such that they can be screwed together to compress the area inside the cap and force water back through the ultrafiltration membrane.

One advantage of the flushing device of the present invention is that the bottle cap water filter does not need to be taken apart in order to clean the ultrafiltration membrane. By providing the flushing mechanism and a bottle cap water filter that is a single unit that cannot be disassembled, the present invention protects the ultrafiltration membrane from any damage or drying out that could be caused by disassembly.

We claim:

1. A device for water purification, comprising:
   a housing;
   a fastener at a first end of said housing, said fastener allowing said housing to be attached onto a water bottle;
   a first opening at said first end of said housing;
   a second opening at a second end of said housing;
   an ultrafiltration membrane contained within said housing and positioned such that water passing from said first end to said second end must pass through said ultrafiltration membrane; and
   a back flushing mechanism located within the housing configured to back flush said ultrafiltration membrane.

2. The device of claim 1, further including a first valve between said second opening and said ultrafiltration membrane, and said back flushing mechanism located between said first valve and said ultrafiltration membrane.

3. The device of claim 2, wherein said first valve includes a mechanical shutoff to shut said first valve.

4. The device of claim 1, further including a second valve positioned between said first end of said housing and said ultrafiltration membrane, such that during back flushing, water does not return into said water bottle.

5. The device of claim 1, further including a charcoal filter positioned within said housing between said ultrafiltration membrane and said second end of said housing.

* * * * *